Figure 1:
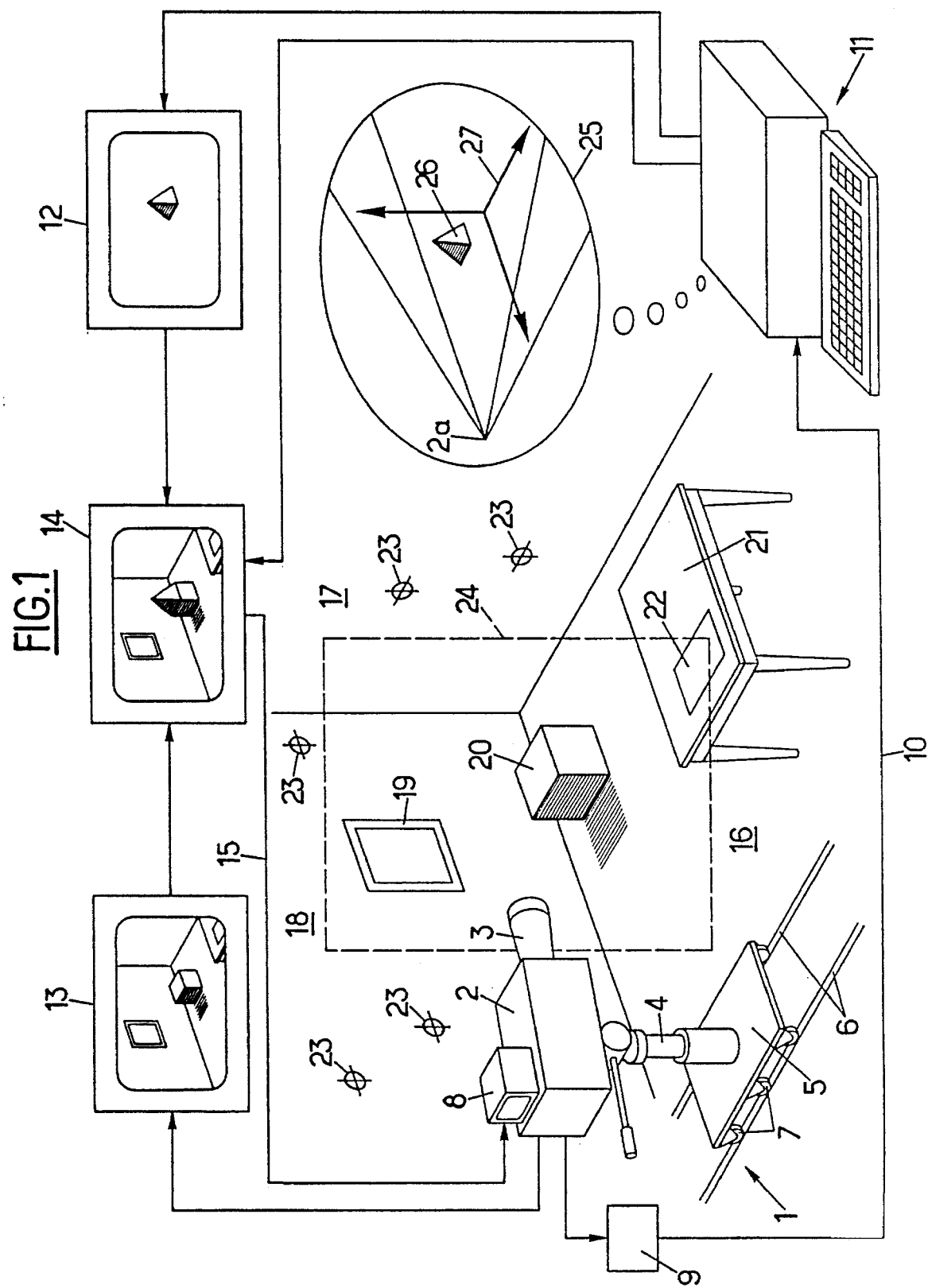

US005479597A

United States Patent [19]
Fellous

[11] Patent Number: 5,479,597
[45] Date of Patent: Dec. 26, 1995

[54] IMAGING SYSTEM FOR PRODUCING A SEQUENCE OF COMPOSITE IMAGES WHICH COMBINE SUPERIMPOSED REAL IMAGES AND SYNTHETIC IMAGES

[75] Inventor: Armand Fellous, Vincennes, France

[73] Assignee: Institut National de l'Audiovisuel Etablissement Public A Caractere Industriel et Commercial, Cedex, France

[21] Appl. No.: 877,961

[22] Filed: Apr. 27, 1992

[30] Foreign Application Priority Data

Apr. 26, 1991 [FR] France .................................. 91 05205

[51] Int. Cl.[6] .................................................. G06F 17/00
[52] U.S. Cl. .............................................. 395/154; 395/119
[58] Field of Search ..................................... 395/154, 119, 395/120; 382/41

[56] References Cited

U.S. PATENT DOCUMENTS 4,970,666  11/1990  Welsh et al. ............................. 395/123

OTHER PUBLICATIONS

Barsamian, "Use of Parallel Processors in a Photo Based Image Generator", Proceedings of the IEEE 1990 National Aerospace and Electronics Conference (1990), pp. 688–693.
Heartz, "Computer Generated Images from Digital Grid Databases", Proceedings of the Energy and Information Technologies South–East Conference (1989), pp. 884–887.

Primary Examiner—Mark K. Zimmerman
Assistant Examiner—Joseph R. Burwell
Attorney, Agent, or Firm—Beveridge, DeGrandi, Weilacher & Young

[57] ABSTRACT

A method of producing images comprising a free combination of real images obtained by a filming system containing a real camera and of synthetic images obtained through a graphics computer equipped with image synthesizing software, wherein: a prior parametric modeling is carried out of the filming system from real images each containing at least one test point whose geometrical position in real space is known, the position of these test points in the image being transmitted to the computer at the same time as the measured values of captured physical dimensions, characteristic of the geometry and of the optics of the real camera and of its support For each image; then, the abovementioned physical dimensions captured for each image are measured in synchronism with the generation of the real images; the captured dimensions are transmitted in real time and in synchronism with the generation of images to the graphics computer in order to determine the parameters of the model of the filming system; a sequence of synthetic digital images is generated whilst deducing from these parameters the computational characteristics of each synthetic image so as to obtain a perfect geometrical coherence between each real image and each corresponding synthetic image; and part of the real image is mixed with part of the synthetic image.

4 Claims, 2 Drawing Sheets

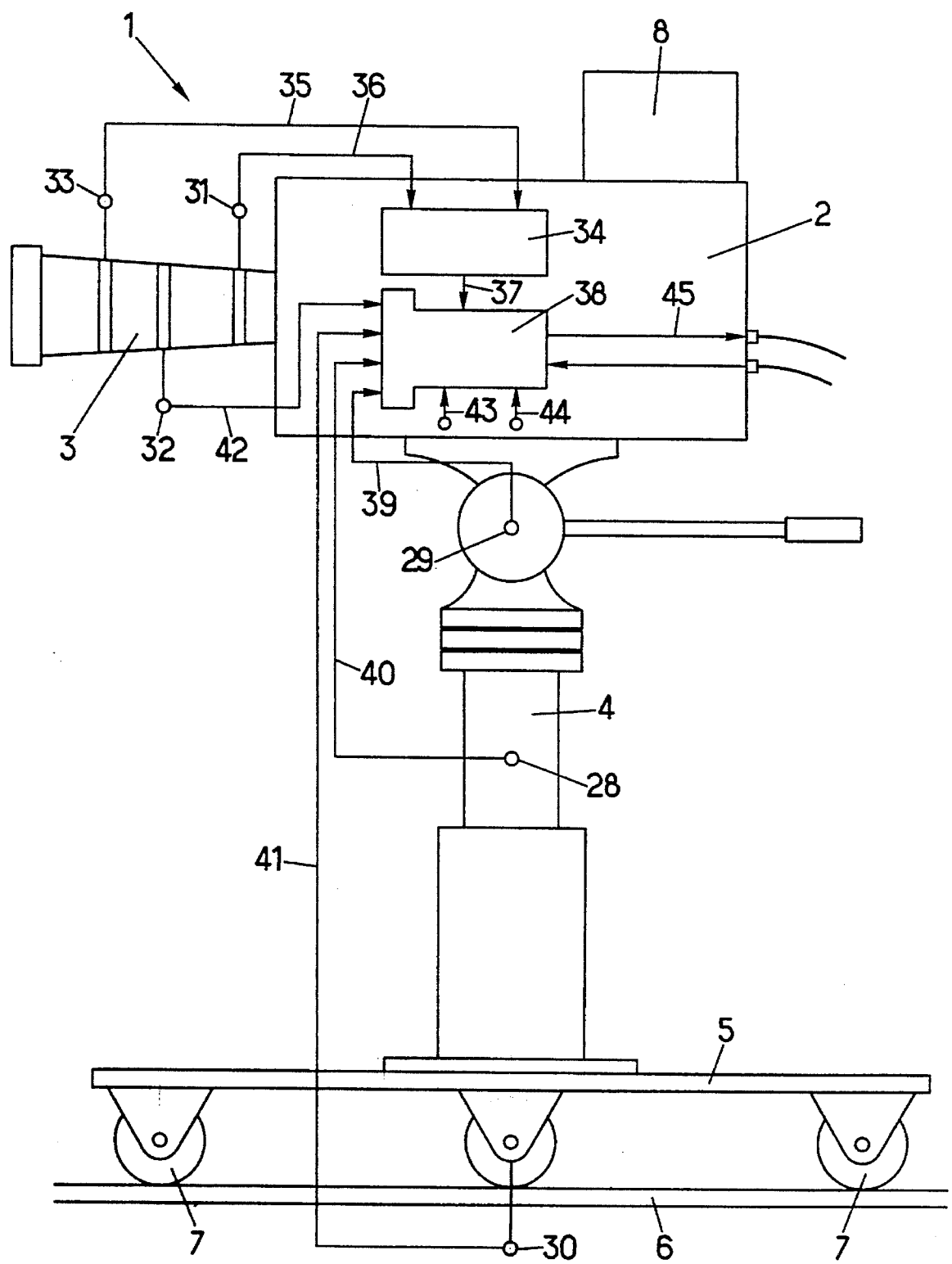

IMAGING SYSTEM FOR PRODUCING A SEQUENCE OF COMPOSITE IMAGES WHICH COMBINE SUPERIMPOSED REAL IMAGES AND SYNTHETIC IMAGES

The invention relates to a method permitting a parametric modeling of a filming system comprising a real camera mounted on a mobile support. It relates also to the production of images each containing a free combination of a real image obtained through a filming system and of a synthetic image obtained through a graphics computer.

The production of synthetic images in three dimensions requires the construction of a base of three-dimensional geometrical entities in the memory of a computer, information describing the visual characteristics of each of the entities being attached thereto. The whole thus constructed constitutes what is called a "virtual" world in contrast to the real world in which for example actors or a filming system progress. This step of construction in the computer is generally called "modeling".

Furthermore, the production of real images obtained by capturing a real scene through a real camera which may advantageously be a video camera forming part of a filming system provides real images or sequences of images. The abovementioned modeling of the real filming system permits determination in the virtual world of a parametric viewing model akin to a "virtual camera".

The synthesizing of images in three dimensions has taken a significant place in the chain for generating images and in their manipulation. Hitherto, however, there are only a few examples of production freely combining synthetic images and real images. The only known examples of production combining synthetic images and real images form part of the area of special effects and constitute short sequences, with delicate focusing, showing up as technical feats.

To produce a combination of images, be it a fixed image or an image forming part of a sequence of images, it is expedient to produce a hybrid image certain parts of which originate from an image obtained through filming of a real scene through a real camera whilst other parts originate from a synthetic image. This image therefore superimposes two or more than two distinct worlds comprising at least one real world and at least one "virtual" world. So that the effect obtained gives the impression of the image of a single world, that is to say of a composite world made by fitting together two parallel worlds, each contributing in part to the final image, it is necessary to obtain perfect visual coherence between the real image and the synthetic image.

To make this notion of visual coherence clearer, let us imagine a wooden cube, painted yellow, placed in front of a filming system and subsequent to adjusting the camera equipping this filming system, the resulting image which is a real image. If, in the memory of a computer, a virtual world is generated, containing a cube having the same dimensions as the real cube to which are allocated attributes of significant aspect "wooden, painted yellow", it is possible to obtain, after fixing the parameters of the virtual camera, a synthetic image of a "wooden cube, painted yellow". The visual coherence between the real image and the synthetic image is the degree of resemblance existing between these two images. The visual coherence relies essentially on geometrical coherence: two images will be said to be geometrically coherent if each vertex of the real cube occupies in the real image the same position as its counterpart from the virtual cube in the synthetic image.

To obtain such a geometrical coherence, it is first of all necessary for the virtual camera to be a correct modeling of the real filming system used and for this modeling to be parametric so as to permit manipulation of the real filming system.

Thus, the first objective of the present invention is to facilitate easy determination in a host computer connected to a real camera forming part of a filming system, of a parametric model of the real camera analogous to a virtual camera.

When this parametric model is produced, it is still necessary for the computer to create, for each real image, a virtual image which is geometrically coherent. It is then possible to speak of dynamic coherence and of real control of the virtual camera by the real camera.

Hence, the object of the invention is also, after having created a virtual camera by means of a parametric model of a real camera forming part of a filming system, the production at each instant of a dynamic coupling between the two cameras, real and virtual, securing perfect coherence between each real image and each virtual image of a series of images and permitting the control of the virtual camera by the real camera and vice versa.

The subject of the invention is also a system for producing images permitting a free combination of real images and of geometrically coherent synthetic images. A dynamic coupling of the real camera and of the virtual camera is thus produced.

According to the invention, the method of parametric modeling of a filming system comprising a real camera mounted on a mobile support uses a host computer connected to various sensors provided on the filming system. According to the invention, a plurality of real images is generated by the filming system, each containing at least one test point whose geometrical position in real space is known.

For each real image thus generated, a plurality of geometrical and optical dimensions of the filming system captured by the abovementioned sensors is measured, and the values of these dimensions captured are transmitted to the host computer.

The host computer is informed of the position of each test point in each image.

Finally, the filming system is modeled by a calculation relating all the information concerning the position of the various test points to the corresponding values of the dimensions captured.

It is expedient preferably to use at least three non-aligned test points. In practice, however, a larger number of test points will be used. These can form part of three-dimensional objects for calibrating predefined and known geometry.

The method according to the invention for producing images containing a free combination of real images obtained by at least one filming system containing a real camera mounted on a mobile support and of synthetic images obtained through a graphics computer equipped with software for synthesizing images, comprises various steps.

First of all, parametric modeling is carried out of the filming system from a plurality of real images each containing at least one test point whose geometrical position in real space is known, the position of these test points being transmitted to the computer at the same time as the measured values of a plurality of captured physical dimensions, characteristic of the geometry and of the optics of the real camera and of its support for each image. The filming system being at any instant characterized by the values of a certain number of variable optical and geometric physical dimensions, the virtual camera constituted by the parametric modeling of the filming system is completely determined at each instant by the values of the parameters which govern it.

The real images generated by the camera of the filming system can be displayed on the screen of the graphics computer. Various graphical plots can thus be superimposed on these real images so as to check the position of the various test points in the real image during the prior modeling operation. It is worth noting in this regard that these various test points may perfectly well subsequently be located out of shot of the real camera when shooting the image sequence.

Once this preliminary modeling phase is completed, the filming of an image or of a sequence of images is undertaken. In the course of the filming of such a sequence, the abovementioned physical dimensions captured for each image are measured, in synchronism with the generation of the real images. The said captured dimensions are transmitted in real time and in synchronism with the generation of images to the host computer in such a way as to define the parameters of the model of the filming system.

Then, a sequence of synthetic digital images is generated at a frequency close to that of the real images whilst deducing from these parameters the computation characteristics of each synthetic image so as to obtain a perfect geometrical coherence between each real image and each corresponding synthetic image.

Finally, part of the real image is mixed with part of the synthetic image in each image of a sequence of images, it being possible for this mixing to be done in the host computer or in an external mixer.

The filming system, which generally comprises a camera and its support, generates images at a known rate (24, 25 or 30 images per second for example). According to the invention, acquisition of the measurements of the physical dimensions governing the real filming system and their transmission to the host computer are done synchronously with the generation of images. For each real image, the computer creates a virtual image which is geometrically coherent therewith. Hence, a dynamic coherence is obtained akin to a full control of the virtual camera by the real camera.

The variable physical dimensions characteristic of the geometry and of the optics of the filming system can in general be modified by applying forces or couples to mobile mechanical parts of the filming system. Thus for example the zoom ring of the objective with variable focal length can be driven in rotation. In the same way, the carriage carrying the camera support on a displacement rail called the dolly rail may have its position modified. The forces required for these movements are applied either manually or by motors. When all the variable physical dimensions of the filming system are modified in the course of the filming of a sequence of images by motors, it becomes possible to reverse the direction of control. The motors controlled by a computer can in effect position the real filming system in such a way that the images which it generates are dynamically geometrically coherent with those supplied by the virtual camera. A control of the real camera by the virtual camera is thus obtained.

The present invention permits both directions of control in respect of a filming system, that is to say a true dynamic coupling of the real camera and of the virtual camera.

After the preliminary phase it may yet be necessary to supplement the parametric modeling of the filming system through the determination of physical dimensions called "shots" which vary from one take to the next but which are kept fixed during each take.

To this effect, an initialization phase prior to the filming is undertaken by generating, by means of the real filming system, a plurality of real images each one resulting from the sighting of a test point whilst making the said test point coincide with the image point aligned with the optical axis of the camera. The position of the test point in space is transmitted to the computer at the same time as the measured values of the physical dimensions captured for each image. The parametric model having thus been supplemented, the filming of the sequence of images can commence as indicated earlier.

In a preferred embodiment of the invention the instantaneous combined images obtained by the method of the invention are furthermore sent in real time to at least one test monitor. The operator of the real filming system can in this way have available on a viewing monitor hybrid images, which greatly facilitates displacements of the filming system during shooting.

In a preferred embodiment of the invention the camera of the filming system is a video camera steered to a synchronizing signal and the recording of each image is associated with a time-code. The data relating to each real image and containing the captured dimensions are then transmitted with the time-code corresponding to the image towards the graphics computer with each synchronizing pulse.

The data transmitted to the computer can advantageously be stored in a memorized file either in the computer or in an external memory. In this way, synthetic images generated at the moment of filming a frequency close to real time are images which are simplified in relation to the synthetic images generated after filming on the basis of the memorized file in order to compose the final combined hybrid images.

The captured dimensions characteristic of the optics and of the geometry of the filming system can comprise for example the aperture of the diaphragm, focusing, the focal length of the objective with variable focal length (zoom), the shutter speed, the elevation of the camera, the rotation of the camera support about its vertical axis, the inclination of the camera support about its horizontal axis, and the position of the camera support carriage in relation to a dolly rail etc.

The system according to the invention for producing images containing a free combination of real images and of synthetic images generally comprises the following elements:

at least one filming system containing a real camera mounted on a mobile support;

a plurality of sensors arranged at various locations on the camera and on its mobile support so as to be able to measure a plurality of physical dimensions characteristic of the geometry and of the optics of the filming system;

electronic means of receiving the data measured by the various sensors, a signal for synchronizing the real images generated by the filming system and a time-code for each image, and for transmitting, with each synchronizing pulse, all of these data in the form of a single packet including the corresponding time-code;

a graphics computer equipped with software for synthesizing digital images;

a link between the said electronic means and the graphics computer.

The system can contain several filming systems each equipped with a real camera.

The cameras used can be video cameras, high-definition (HD) television cameras in the same way as cinematographic cameras.

The invention will be better understood on studying an entirely non-limiting exemplary embodiment illustrated diagrammatically by the attached drawings in which:

FIG. 1 shows diagrammatically the whole of an image producing system according to the invention and FIG. 2 illustrates in a simplified manner a filming system containing a camera and a mobile support, it being possible for the whole to be used in the image producing system of FIG. 1.

As illustrated in FIG. 1, the image producing system of the invention comprises a filming system referenced 1 as a whole, comprising a video camera 2, equipped with an objective 3 with variable focal length, and mounted on a support constituted by a pedestal 4 and a carriage 5 able to move on rails 6 for dolly movements by means of wheels 7. A viewing monitor 8 is arranged on the camera 2. The camera furthermore comprises an electronic acquisition card 9 represented diagrammatically in the form of a block in FIG. 1. The electronic card 9 is linked via the link 10 to a graphics computer 11 equipped with software for synthesizing digital images. The digital synthetic images generated by the computer 11 can be viewed on a screen 12. The real images generated by the camera 2 can for their part be viewed on a screen 13. Of course, the screens 12 and 13 could form one.

According to the invention, the computer 11 is furthermore capable, after having secured the geometrical coherence between the real image appearing on the monitor 13 and the synthetic image appearing on the monitor 12, of mixing these two images so as to create a hybrid combined image containing parts of the real image and parts of the synthetic image. Of course, in a variant, this mixing could be done by a conventional mixer. This combined hybrid image appears on the test monitor 14 which could equally be constituted by a window in the screen 12 of the computer 11. The hybrid image can likewise be returned via the connection 15 to the viewing monitor 8.

As can furthermore be seen in FIG. 1, the filming system 1 is located in a room representing the real world and containing by way of example a floor 16 on which are placed the rails 6 and two walls 17 and 18 at right angles. On the wall 18 is a picture 19. A cubic volume 20 and a table 21 on which is placed a sheet of paper 22 are also found in the real setting. A plurality of test points 23, here five in number in the example illustrated, are constituted by small targets drawn or stuck onto the respective walls 17 and 18 at various spots. In FIG. 1 is found furthermore schematized in the form of a fine-lined rectangle 24 the maximum field of view of the filming system 1 provided for the final filming. It will be noted that the various test points 23 lie out of the final shot thus delimited.

The virtual world which is defined by a parametric model built up in the computer 11 and which is capable of generating a synthetic image in the form of a pyramidal object 26 oriented with respect to a reference trihedron 27 and seen by a "virtual camera" 2a has also been represented symbolically in FIG. 1 under the reference 25.

According to the present invention, the object 26 exhibits a perfect geometrical coherence with the real image. Under these conditions, not only is its orientation correct with respect to that of the cubic object 20, but also its dimensions are compatible in such a way as to make it possible, by combining the real image visible on the screen 13 with the synthetic image visible on the screen 12, to obtain a combined image appearing on the screen 14 and in which it is impossible to distinguish the real elements from the synthetic elements.

Referring to FIG. 2, it is seen that the filming system 1 contains a plurality of sensors arranged at various locations on the camera 2 and on its support 4, 5. By way of example, in FIG. 2 has been represented a sensor 28 for the so-called panning movements, that is to say rotation about a vertical axis of the pedestal 4, a sensor 29 of tilting movements, that is to say rotation about a horizontal axis, a dolly sensor 30 supplying an indication of the displacements of the carriage 5, a focusing sensor 31 mounted on the focusing ring of the objective 3, a diaphragm aperture sensor 32 also mounted on the objective 3 and a zoom sensor 33. An electronic circuit 34 forming part of the acquisition card 9 visible in FIG. 1 receives, via the connections 35 and 36, the signals emitted by the focusing 31 and zoom 33 sensors. They may in particular be sensors equipped with an optical coding system supplying data on angular displacements. The data processed by the electronic circuit 34 are next sent via the connection 37 to an electronic acquisition circuit 38 forming part of the acquisition card 9 visible in FIG. 1 which receives the signals output by the other sensors via the connections 39, 40, 41 and 42.

The signals corresponding to the various sensors are generally in analog form.

The various sensors 31, 32, and 33 supply information on the optical characteristics of the filming system. Of course, other optical characteristics could be taken into account in practice.

The various sensors 28, 29 and 30 supply information on the geometrical characteristics of the filming system.

It will of course be understood that the number of these sensors could be increased by comparison with the example illustrated. Information could in particular be given on the height of the camera relative to the ground and on other orientations of the camera relative to its pedestal.

The sensors 28, 29 and 30 can advantageously be constituted in the form of optical coders, the information from which is processed directly by the acquisition circuit 38.

The acquisition circuit 38 furthermore includes a synchronizing input 43 receiving the synchronizing pulses for the images generated by the camera 2 as well as an input 44 receiving the time-code corresponding to each generated image.

The role of the acquisition circuit 38 is to collect all the values measured by the various sensors in synchronism with the video filming and to send them in packets each corresponding to a time-code by way of the output connection 45 towards the graphics computer 11.

The functioning of the image producing system according to the invention will now be described.

The filming system 1 constituted by the complete camera 2 with its optics 3 with variable focal length and its handling system permitting horizontal and vertical panning, its pedestal 4 permitting elevation and its carriage system 5 permitting dolly movements over the rails 6, is used to simultaneously obtain images of the real scene and furthermore control in the graphics computer 11 a collection of parameters permitting calculation of synthetic images in three dimensions. More precisely, the whole of the system is designed so that the virtual world 25 seen by the virtual camera 2a and viewed in synthetic images is constantly coherent from a geometrical point of view with the real world seen by the camera 2.

To illustrate this principle of coherence let us consider the cube 20 which has certain real dimensions. In the virtual world 25 the computer 11 equipped with its software for synthesizing images is capable of creating a pyramid 26 with a square base containing a side exactly identical to the side of the real cube 20 and oriented in the same way. The camera 2 freely manipulated by its operator can then create according to the invention a sequence of images having this cube 20 as subject in the real setting visible on the screen 13. Simultaneously and with substantially the same frequency, an equivalent sequence of synthetic images is created by the computer 11 and are such that if the real and corresponding synthetic images are superimposed in pairs, the real cube 20 and the synthetic pyramid 26 superimpose exactly giving the impression of a single volume. This property of the system illustrates the geometrical coherence between the two sources of images, real and virtual.

To obtain such geometrical coherence it is necessary to know very precisely all of the geometrical and optical physical characteristics of the real filming system 1 insofar as such characteristics affect the real image produced at each instant.

These physical characteristic dimensions divide up into several categories:
constant physical dimensions fixed for all takes
physical dimensions which are constant during one take but may vary from one take to the next and known as "shot dimensions"
finally the physical dimensions which are variable in the course of the filming and are continuously measured by the various sensors 29 to 33 and known as "captured dimensions".

Among the physical dimensions which are constant for all filming, it will be possible to note for example the size of the matrix of CCD diodes of the camera 2, the number of cells of this matrix, the offset between the optical axis and the center of the matrix of CCD diodes, and the relative position between the vertical panning axis of the pedestal 4 and the horizontal axis 29 of the tilting movement.

Among the physical dimensions which are fixed during taking but which may vary from one take to the next, will be noted for example the position of the rail 6 in the real world or, in the absence of a dolly, the position of the support pedestal of a fixed camera.

The "captured" physical dimensions are for their part for example those which are measured by the sensors illustrated in FIG. 2, referenced 28 to 33.

According to the invention, before every take, an analysis phase of the filming system is undertaken so as to define a parametric model of the filming system in the graphics computer 11.

To this effect, a plurality of real images each containing at least one of the test points 23 is produced with the aid of the filming system 1 containing the camera 2. The geometrical position of each of the test points 23 in real space being perfectly known, it may be inserted for geometrical information purposes into the graphics computer 11. It will be noted that whilst producing these real images, the camera 2 is placed in such a way as to be able actually to view the various test points 23 placed, as stated earlier, outside the normal field of the future take.

For each of the real images thus generated all the captured dimensions are processed by the electronic circuit 34 and the electronic acquisition circuit 38 and then transmitted in synchronism with the images via the link 45 to the computer 11.

After having thus produced a plurality of such images in which, each time, a certain number of test points 23 is encountered each identified by a numeral for example, there is undertaken in the computer 11 the analysis of the relationship between the information on the position of the various test points, conveyed by the real images emanating from the camera 2 itself, and the corresponding information supplied simultaneously by the various sensors of the variable optical and geometrical characteristics of the filming system 1.

It will be noted that it is necessary to have available at least three non-aligned test points 23 in order to supply adequate information to the computer 11. 10 In practice however a larger number of such test points 23 will be provided.

It will be noted that in a preferred embodiment of the invention, the images generated by the camera 2 can be displayed at the same time on other test monitors, on the screen 12 of the graphics computer 11 in a particular zone of this screen or window which can be positioned where desired. It is then easy to execute, by programming into this same window, various graphical plots which become superimposed on the image output by the camera 2 of the filming system 1. Given that in each real image output by the filming system 1, a certain number of test points 23 completely identified by their numeral is encountered, it is easy, by moving a cursor over the window for example with the aid of a mouse and by clicking the mouse when the cursor is on a test point, to inform the computer 11 of the exact position of this test point in the image.

Of course, any other method enabling the graphics computer to be informed of the position of the various test points in the image can suit.

By virtue of all of this information, it is then possible to produce a parametric model in the virtual world of the real filming system, constituting a kind of virtual camera in the virtual world. The computer is thus able to memorize a plurality of conversion tables supplying the values of the parameters of the virtual camera for each modification of one of the parameters of the real camera. It will be noted that the definition and computation of this parametric model of the real filming system 1 is done once and for all for each filming system so that there is no reason to repeat these operations several times.

In certain cases it may happen, as indicated earlier, that certain fixed physical dimensions of the filming system 1 may vary however between two takes. In this case it is further necessary, before actual filming, to undertake a so-called "initialization" operation enabling the computer 11 to be informed of the actual situation of the filming system 1 in the real world. This may be the case for example if the rails 6 have been moved into another real setting since the previous take.

To this effect, the parametric model of the filming system must be supplemented with physical dimensions known as "shot dimensions" characteristic of the position of the mobile support in space. For this purpose, a plurality of real images is again generated by means of the camera 2, each image resulting from the sighting of a test point 23 by making the said test point coincide with the image point aligned with the optical axis of the camera. Such a successive sighting of a certain number of test points 23 is undertaken. This initialization operation is therefore similar to the previous operation. However, here only a single test point 23 per image is considered and this point is always in the same place in the image. It suffices therefore to inform the computer 11 of the numeral of the test point. The position of each test point in space is transmitted to the computer at the same time as the measured values of the captured dimensions output as previously by the various sensors 28 to 33 and processed by the electronic circuits 34 and 38.

After this initialization operation, the filming of the desired sequence of real images is undertaken, the test points 23 then remaining outside the field illustrated at 24 in FIG. 1.

During the filming, the various values measured by the sensors 28 to 33 are processed in real time. The signals corresponding to the physical dimensions captured for each image are therefore transmitted by way of the electronic acquisition circuit 38 in real time and in synchronism with the generation of images in the form of a packet containing in addition the time-code. The computer 11 therefore has available during the filming for each real image indexed by its time-code, all the information enabling it to compute the parameters of the corresponding virtual camera 2a. This information is first of all stored in a file associated with the corresponding take for the purposes of subsequent usage. Simultaneously the computer 11 generates synthetic images seen by the virtual camera 2a at a rate close to that of the real filming system 1. This real time requirement therefore implies that the synthetic images may possibly be simplified relative to the final synthetic images which will be generated later from the memorized file built up during the fimling and which will actually be used for the final composition with the real images.

During the filming two sources of images are therefore continuously available, the real images originating from the filming system 1 and the synthetic images originating from a virtual world 25 and which are geometrically coherent with them. These two sources may then be mixed in real time and the hybrid image displayed on a certain number of test monitors such as 14 intended for the directors, the actors if appropriate, the cameramen, etc. In a preferred embodiment of the invention, as illustrated in FIG. 1, the hybrid image thus obtained is returned to the viewing monitor 8. The cameraman manipulating the camera 2 can then operate as if the real filming system 1 were equipped with a mixed camera filming a hybrid space blending real space and a virtual space thus securing excellent ergonomics and high flexibility of the method of the invention.

The mixing of the real images and of the synthetic images can be done conventionally through inlaying, for example inlaying on a blue background or inlaying dependent on brightness.

The method of the invention can readily be applied to studio image production in which for example real images will comprise real actors filmed on a blue background. The synthetic images will then comprise for example settings, the combined images containing the real 10 actors moving in front of the synthetic settings.

In another application of the method of the invention to outside image production, the real images may comprise a real setting such as a natural setting and the synthetic images may comprise for example an architectural element such as a building plan, the combined images then containing the synthetic architectural element in its real setting.

It will also be possible to envisage generating by computer matte of real elements present in the scene or even substituting synthetic elements for real elements.

Generally, it will be understood that the perfect dynamic coupling produced according to the invention between the real camera and a virtual camera allows all kinds of combinations between real images and virtual images, with perfect geometrical coherence.

I claim:

1. An imaging system for producing a sequence of composite images constituted by a superimposed combination of real images featuring the real world and of synthetic images representing a virtual world comprising;

at least one filming system including camera means mounted on mobile support means capable of creating a sequence of real images;

a plurality of sensor means arranged at various locations on said camera means and its mobile support means for continuously measuring a plurality of physical data characterizing said filming system, said data including geometrical and optical data;

electronic control means for (a) receiving said data for each real image, (b) generating a time-code for each real image, and (c) transmitting, with the data for each real image, single packets which include said time code and a synchronizing pulse;

a graphics computer equipped with software for synthesizing images;

and linking means for carrying said single packet and the data for their respective real images between said electronic control means and said graphics computer.

2. The system as claimed in claim 1, wherein the camera means is one of the following:

a video camera;

a high-definition television camera;

a cinematographic camera.

3. The system as claimed in claim 1, comprising several real filming systems.

4. The system as claimed in claim 1, comprising at least one test monitor for receiving in real time the combinations of real images and of synthetic images.

* * * * *